April 2, 1929.   W. E. HOLLAND   1,707,857
ASYMMETRIC CELL
Filed Nov. 18, 1925   3 Sheets-Sheet 1

Inventor:-
Walter E. Holland.
by his Attorneys,
Howson & Howson

April 2, 1929.   W. E. HOLLAND   1,707,857
ASYMMETRIC CELL
Filed Nov. 18, 1925   3 Sheets-Sheet 2

Inventor:
Walter E. Holland.
by his Attorneys,
Howson & Howson

April 2, 1929.  W. E. HOLLAND  1,707,857
ASYMMETRIC CELL
Filed Nov. 18, 1925   3 Sheets-Sheet 3

Inventor-
Walter E. Holland.
by his Attorneys-
Howson & Howson

Patented Apr. 2, 1929.

1,707,857

UNITED STATES PATENT OFFICE.

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

ASYMMETRIC CELL.

Application filed November 18, 1925. Serial No. 69,830.

This invention relates to electrolytic cells, and more particularly to that class of electrolytic cells known as asymmetric cells or cells exhibiting the property of asymmetric conduction.

The principal object of the invention is to provide an asymmetric cell having a film-forming electrode and a non-filming electrode, with means for preventing formation of a coating or accumulation of deleterious substances on the film-forming electrode during the periods of inactivity, thereby insuring almost immediate normal operation of the cell when put into use.

A more specific object of the invention is to provide an electric system including an electrolytic rectifier or condenser cell, with means for short-circuiting the electrodes of said cell during the periods of nonuse.

A further object of the invention is to provide a novel form of clip for temporarily short-circuiting the terminals of individual asymmetric cells during shipment or in storage, thereby insuring delivery of the assembled cells in condition for quickly commencing to function.

In the attached drawings:

Fig. 6 is a view similar to Fig. 3 but further illustrating a smoothing system embodying electrolytic condensers.

Fig. 7 is a similar view but showing a still further modification in the circuit arrangement.

Figure 1:
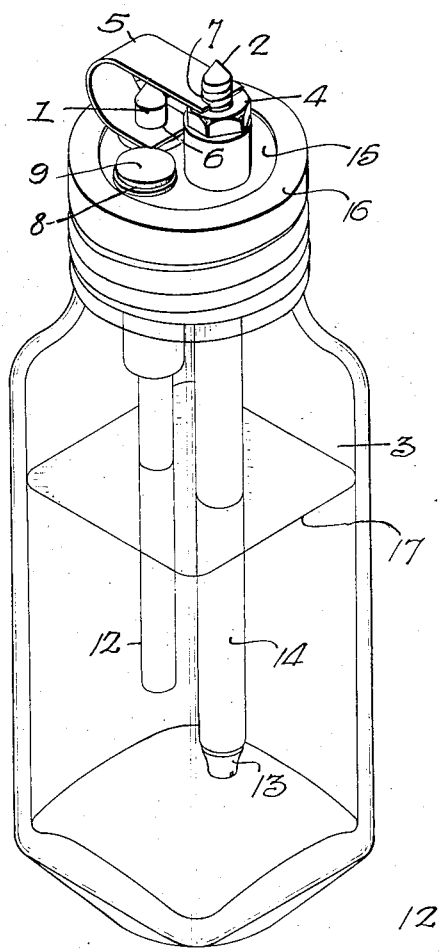
Figure 1 is a view in perspective of an asymmetric cell equipped with novel means forming a part of this invention for short-circuiting the cell terminals.

With reference to the drawings, I have illustrated in Fig. 1 a preferred form of asymmetric electrolytic cell. This cell may be used as a rectifier or a direct-current condenser and preferably comprises a suitable conductive anode 12 and a second electrode 13 of a film-forming metal, having the external terminals 1 and 2, respectively. The electrodes 12 and 13 may be supported by a cover 15 of insulating material which is secured to the top of the container 3 by the threaded ring 16. The container is partly filled with a suitable electrolyte 17.

The electrode 13 may consist of aluminum, tantalum, magnesium or other film-forming material and may be insulated to a point well below the surface of the electrolyte by the sleeve 14 of suitable insulating material. The electrode 13 preferably has a relatively small surface exposed to the action of the electrolyte, when the cell is to be used as a rectifier, and a much greater surface when the cell is to be used as a condenser. The anode 12 may consist of carbon, lead or other non-filming conductive material, or of an iron-silicon alloy as described in my co-pending application Serial Number 612,405, filed January 13, 1923. The general form of these cells and the manner in which they function is well known in the art and requires no further description.

It has been found, however, that in the cells of the above type there is a tendency before the new cells are put to use and during periods of inactivity to form on the film-forming electrodes a coating of metallic impurities or other objectionable material which when the cell is again connected for operation may cause delay or failure of the cell to function as a rectifier or condenser, as the case may be. Since for many uses, and particularly for use in radio apparatus, it is essential that the cell be capable of functioning very soon after closing the circuit at any time, sometimes after protracted periods of inactivity this coating of the film-forming electrode constitutes a serious defect.

I have discovered that if the electrodes are short-circuited during the periods of inactivity, there is little or no tendency toward the formation of the deleterious coating on the film-forming electrode, and that the cells may be allowed to remain inactive over protracted periods of time without endangering their ability to function properly and quickly when the short-circuit is removed and they are put into use.

One of the very material advantages accruing to this invention resides in the fact that it is thereby made possible to ship and store the asymmetric cells, containing the electrolyte and ready for immediate use, with assurance that they will be delivered in such condition as to function properly and almost immediately when put into use.

In Fig. 1, I have illustrated simple and effective means for short-circuiting the terminals of the electrodes, which is easily removed when the cell is to be placed in operation. The particular form of cell illustrated comprises electrode terminals 1 and 2 which project to different heights above the top of the container 3. In the present instance, the terminal 2 is threaded at the top for reception of a retaining nut 4, and these threads are taken advantage of in the designing of the clip 5 which is shown short-circuiting the terminals. This clip, as illustrated in Fig. 2, consists of a substantially hook-shaped flat strip of spring metal, the turned-under end of which is provided with an aperture 6, while the other extremity is provided with a recess 7.

Figure 2:
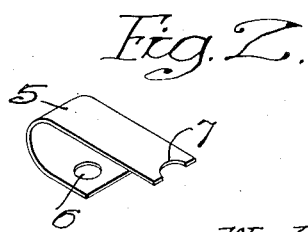
Fig. 2 is a view in perspective of one form of short-circuiting clip detached from the cell.

In the normal position of this clip, as shown in Fig. 2, the linear distance between the aperture 6 and the recess 7 is greater than the corresponding distance between the terminals 1 and 2. In use, the clip is placed with the terminal 1 projecting through the aperture 6, and the strip is then flexed in such manner as to bring the recess 7 in back of the terminal 2 and against that side of the terminal toward the terminal 1. As previously stated, the upper end of the terminal 2 is threaded, and these threads engaging the recessed edge of the clip prevent movement thereof longitudinally of the terminal, this retaining action of the threads being accentuated by the tension of the clip which forces the recessed end 7 firmly against the threaded side of the terminal.

As clearly illustrated in Fig. 1, the cover of the cell is provided with a flanged opening 8 which constitutes both a filler opening and a vent and is adapted for reception of a cork 9 for thoroughly sealing this opening when the cell containing the electrolyte is shipped or moved from one place to another. Obviously to prepare the cell for operation, it is only necessary under these circumstances to remove the cork 9 and the clip 5. With the design of the clip shown which covers one of the terminals, it is made difficult or impossible to place the cell with its terminals in proper operating position with respect to the terminal-engaging contactors without removing the clip.

Figure 8:
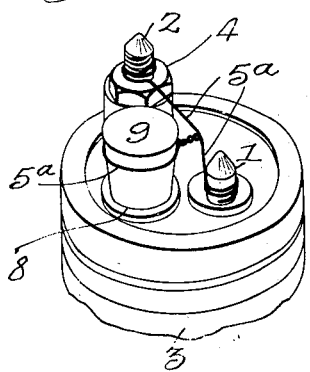
Fig. 8 is a view in perspective of the top of an asymmetric cell, showing an alternative form of combined short-circuiting device and cell stopper.

In Fig. 8 is shown an alternative form of short-circuiting device consisting of a conductor $5^a$, say spring wire, which is attached to the cell stopper 9. The two ends of this conductor may be formed into spirals adapted to grip the terminals 1 and 2 when forced over the same. The stopper and the attached wire device must be removed from the cell when it is desired to put the cell into service.

Figure 9:
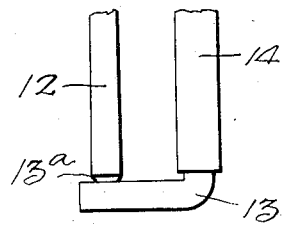
Fig. 9 is a view showing an alternative means of carrying out my invention without the use of a short-circuiting clip.

A still further embodiment of my invention is shown in Fig. 9, wherein the electrode 13 is provided with a transversely extending portion $13^a$, the end of which is positioned directly below the electrode 12. The latter is so supported that it may be moved from a normal operating position to that shown in Fig. 7, where in it is in electrical engagement with the horizontal portion $13^a$ of the electrode 13. Thus the use of a short-circuiting clip above the cover 15 may be avoided. When it is desired to use the cell, the electrode 12 is raised out of contact with the electrode 13.

Although I have illustrated in Figs. 1, 2, 8 and 9, several specific embodiments of my invention, it will be apparent that various changes and modifications may be made therein, since the invention in its broader aspects resides in the short-circuiting of the electrodes by any means to prevent the coating of the film-forming electrode by objectional substances.

Figure 3:
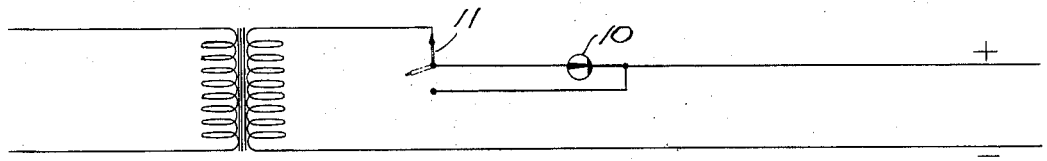
Fig. 3 is a diagrammatic view of a half-wave rectifying system made in accordance with my invention.

The invention is also applicable with material advantage to electrical systems which include asymmetric cells. Fig. 3 shows diagrammatically such system which includes a single electrolytic rectifier cell 10. The circuit of this device is controlled in the present instance by a switch 11 of the double-throw type, the blade of the switch in one position closing the main operating circuit of the rectifier system and in the alternate position breaking this circuit and closing a circuit shunting the cell 10 and short-circuiting the electrodes thereof. Since the switch has no intermediate position, such arrangement provides for the automatic short-circuiting of the electrolytic cell whenever the rectifier system is thrown out of use.

Figure 4:
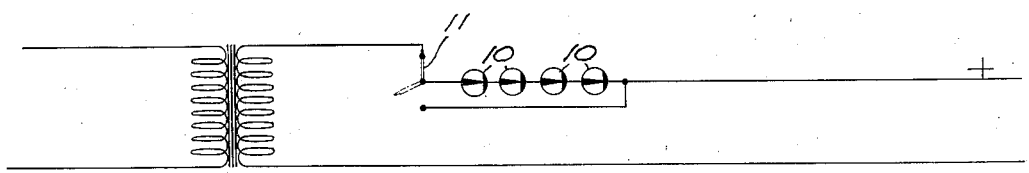
Fig. 4 is a diagrammatic view of a half-wave rectifying system employing a plurality of rectifier cells and also embodying my invention.

A similar arrangement, as used in conjunction with a plurality of rectifier cells, is illustrated in Fig. 4, the switch 11 in this instance functioning in the "off" position to close a shunting circuit to short-circuit the four serially connected rectifier cells forming a part of this rectifying system. In this manner, as will be apparent, all four cells are short-circuited by means of the single switch 11.

Figure 5:
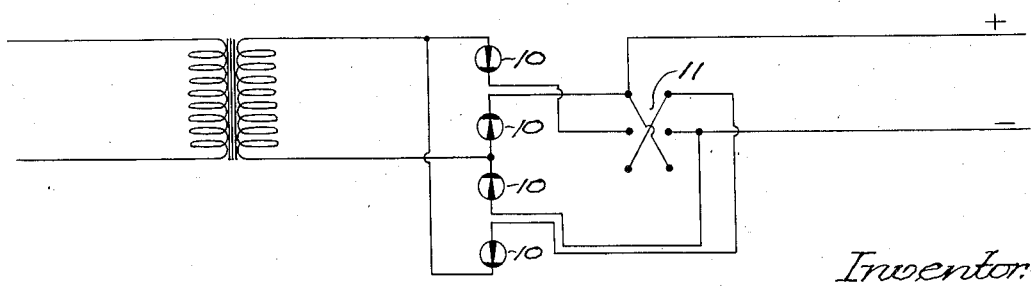
Fig. 5 is a diagrammatic view illustrating the layout of a full-wave rectifying system made in accordance with my invention.

In Fig. 5, I have illustrated the invention as applied to a rectifier system of the full-wave type. In this instance I employ a double-pole double-throw switch which functions in one position to close the operating circuit of the rectifier, and in the alternate position to short-circuit the four cells included in the apparatus in two pairs so that their respective polarities are not in opposition.

A further embodiment of my invention is illustrated in Fig. 6 wherein transformer secondary circuit 18 having output conductors 19 and 21 is provided with current-smoothing apparatus 22 in addition to the usual rectifier cell 10 illustrated in Figs. 3 to 5, inclusive. The filtering apparatus 22 comprises an inductive reactor 23, which is included in the conductor 19 in serial relation to the rectifier cell 10, and a pair of condensers 24 and 25 which are connected in shunt relation to the secondary circuit 18 at opposite sides of the reactor 23. In accordance with my invention, the condensers 24 and 25 may comprise electrolytic cells wherein the film-forming electrode 13 is connected to the positive conductor 19 and the other electrode 12 is connected to the negative conductor 18.

The rectifier cell 10 as well as the condensers 24 and 25 may be short-circuited during periods of idleness by means of a double-pole double-throw switch 26 which includes a pair of switch blades 27, 28 and a pair of co-acting stationary contact elements 31, 32. The switch blades 27, 28 are respectively connected through the conductors 19 and 21 to the non-filming electrodes 12 of the rectifier cell 10 and of the electrolytic condensers 24 and 25. The stationary switch elements 31 and 32 may be connected by a conductor 33, and the former switch element connected by a conductor 34 to the film-forming electrode 13 of the rectifier cell 10. When the switch 26 is actuated so as to cause the switch blades 27, 28 to engage respectively the stationary switch elements 31, 32, short-circuiting paths are provided for the rectifier cell 10 and the electrolytic condensers 24 and 25. These paths have one portion in common, namely,— that provided by the conductor 34.

As a result of this arrangement, it is apparent that the rectifier cell 10 as well as the electrolytic condenser cells 24 and 25 may be so connected by the single switch 26 as to provide the necessary short-circuiting paths for the periods of idleness, the respective polarities of said rectifier and condenser cells in the common portion 34 being not in position. When the switch blades 27, 28 are moved into engagement with an opposite pair of stationary switch elements 35, 36, the above described short-circuiting paths are interrupted and the system is caused to function in the usual manner.

My invention contemplates a further circuit arrangement, as illustrated in Fig. 7, wherein a tumbler or snap switch 37 is provided with a pair of contacts 38, 39, includes in an input circuit 41 of a transformer 42, an output circuit 43 of which corresponds to the transformer secondary circuit 21 described in connection with Fig. 6. The tumbler switch 37 is also provided with a second pair of stationary contact elements 44, 45 which are respectively connected to the anode 12 and the cathode 13 of the rectifier cell 10.

The pairs of contacts 38, 39 and 44, 45 are so related that when the switch 37 is moved into the "off" position, the primary circuit 41 is interrupted and the switch contact points 44, 45 are connected to shunt the rectifier cell 10. Thus the necessary short-circuiting paths for the rectifier cell 10 and the condensers 24 and 25 are provided, with the result that currents may pass or tend to pass said condensers 24 and 25 as well as from said rectifier cell 10 without meeting opposing electromotive forces or high resistance from the rectifier cell 10. When the switch is moved into the "on" position, the aforementioned short-circuiting paths are interrupted and the system is caused to operate in the usual manner.

In some cases it may be desirable to use a non-electrolytic type of rectifying unit at 10 in combination with electrolytic condensers as shown in Figs. 6 and 7. In such a case, the short-circuiting would simply provide a low-resistance path around the rectifying unit 10 for the conditioning of said condensers, without effect on said rectifying unit.

Although the aforedescribed devices are especially desirable by reason of their foolproof characteristics and the fact that they automatically insure the maintenance of the cells in readiness for proper operation at any time, it will be apparent that the invention is not limited to these particular arrangements, and that it is capable of numerous embodiments and modifications without departing from the essential features.

I claim:

1. In an electric system having a rectifier circuit, an electrolytic rectifier cell, a short-circuiting shunt circuit for said cell and common means for controlling the rectifier circuit and the short-circuiting circuit.

2. An electric system comprising an asymmetric electrolytic cell, a short-circuiting shunt for said cell, and a single switch adapted in alternate positions to close the operating circuit and the shunt circuit, respectively.

3. An electric system including a plurality of asymmetric electrolytic cells, and a single switch adapted in alternate positions respectively to short-circuit said plurality of cells and to close the operating circuit through said cells.

4. The method of preventing accumulation of objectionable materials on the film-forming electrode of an asymmetric electrolytic cell, which consists in short-circuiting the electrodes of said cell during periods of inactivity.

5. An electrical system including a rectifier cell and a condenser, and means adapted to provide short-circuiting paths for said cell and said condenser.

6. An electrical system including a rectifier cell and an electrolytic condenser, and means adapted in one operative position to provide short-circuiting paths for said cell and condenser.

7. In an electrical system, the combination with an electrolytic rectifier cell and an electrolytic condenser cell, of means providing, in one position, short-circuiting paths having a common portion wherein the polarities of said cells are in the same direction.

8. In combination, a work circuit including an electrolytic rectifier cell and an electrolytic condenser cell, and means adapted in one position to provide short-circuiting paths for said cells and in another position to interrupt said paths.

9. An electrical system including a serially connected rectifier cell, an electrolytic condenser cell connected in shunt relation thereto, and means affording short-circuiting paths for said cells having a common portion wherein the respective polarities are in the same direction, said means being also operative to render ineffective said system.

10. An electrical system including a rectifier cell, filtering means including an electrolytic condenser cell, and means adapted in one position to close said system and in another position to open-circuit said system and to provide short-circuiting paths for said cells.

11. An electrical system including an electrolytic rectifier cell, filtering means including an electrolytic condenser cell and a switch adapted in one position to close said system and in another position to open-circuit said system and to provide short-circuiting paths for said cells.

12. An electrical system including an electrolytic rectifier cell, filtering means including an electrolytic condenser cell and a switch adapted in one position to close said system and in another position to open-circuit said system and to provide short-circuiting paths for said cells, said paths having a portion in common wherein the polarities of said cells are in the same direction.

13. An electric system comprising an asymmetric electrolytic cell, means for rendering said system operative and inoperative at will and for short circuiting said cell when the system is inoperative, and means whereby the actuation of the first-named means to render the said system inoperative results automatically in the short circuiting of said cell and vice versa.

14. An electric system comprising a plurality of asymmetric electrolytic cells, switch means for controlling the operating circuit of the system and for short circuiting the cells, said means being interrelated whereby actuation of the switch to open the operating circuit results in the short circuiting of the cells.

WALTER E. HOLLAND.